(12) United States Patent
Sanderford, Jr. et al.

(10) Patent No.: US 7,945,626 B2
(45) Date of Patent: May 17, 2011

(54) METHOD, SYSTEM, APPARATUS, AND COMPUTER PROGRAM PRODUCT FOR DETERMINING A PHYSICAL LOCATION OF A SENSOR

(75) Inventors: H. Britton Sanderford, Jr., New Orleans, LA (US); Gregg A. Larson, Mandeville, LA (US)

(73) Assignee: M&FC Holding, LLC, Pittsburg, PA (US)

( * ) Notice: Subject to any disclaimer, the term of this patent is extended or adjusted under 35 U.S.C. 154(b) by 436 days.

(21) Appl. No.: 11/376,097

(22) Filed: Mar. 16, 2006

(65) Prior Publication Data

US 2006/0242323 A1    Oct. 26, 2006

Related U.S. Application Data

(60) Provisional application No. 60/661,928, filed on Mar. 16, 2005.

(51) Int. Cl.
| | |
|---|---|
| *G06F 15/16* | (2006.01) |
| *H01Q 3/00* | (2006.01) |
| *G01S 5/02* | (2010.01) |
| *G01S 3/02* | (2010.01) |
| *H04W 24/00* | (2009.01) |
| *H04W 40/00* | (2009.01) |

(52) U.S. Cl. ........ 709/206; 709/201; 709/204; 342/359; 342/419; 342/457; 455/423; 455/446

(58) Field of Classification Search .................. None
See application file for complete search history.

(56) References Cited

U.S. PATENT DOCUMENTS

| | | | | |
|---|---|---|---|---|
| 4,639,900 | A | * | 1/1987 | Gustafson .................. 367/5 |
| 5,010,583 | A | * | 4/1991 | Parken .................... 455/9 |
| 5,036,497 | A | | 7/1991 | Heitman |
| 6,100,806 | A | | 8/2000 | Gaukel |
| 6,236,938 | B1 | * | 5/2001 | Atkinson et al. ............ 701/214 |
| 2002/0044042 | A1 | * | 4/2002 | Christensen et al. ........ 340/3.54 |
| 2002/0145537 | A1 | * | 10/2002 | Mueller et al. ........... 340/870.02 |
| 2003/0087648 | A1 | | 5/2003 | Mezhvinsky et al. |
| 2003/0152061 | A1 | * | 8/2003 | Halsey et al. ............ 370/342 |
| 2004/0260762 | A1 | * | 12/2004 | Fish ..................... 709/201 |
| 2005/0058084 | A1 | * | 3/2005 | Hester et al. ............. 370/254 |
| 2006/0125692 | A1 | * | 6/2006 | Wang et al. .............. 342/451 |
| 2009/0053993 | A1 | * | 2/2009 | Baker et al. .............. 455/7 |

* cited by examiner

*Primary Examiner* — Ario Etienne
*Assistant Examiner* — Ho Shiu
(74) *Attorney, Agent, or Firm* — Oblon, Spivak, McClelland, Maier & Neustadt, L.L.P.

(57) ABSTRACT

A method that determines a physical location of an unknown position device (UPD) in a communication network including a plurality of known position devices (KDPs), in which a message transmitted by the UPD is received by plural KDPs. The method includes measuring a signal quality of each received message received by the plural KDPs from the UPD, and computing the likely physical location of the UPD based on the physical location of the plural KPDs receiving the message from the UPD and the respective signal quality measured at each KPD.

20 Claims, 6 Drawing Sheets

METHOD, SYSTEM, APPARATUS, AND COMPUTER PROGRAM PRODUCT FOR DETERMINING A PHYSICAL LOCATION OF A SENSOR

CROSS REFERENCE TO RELATED APPLICATIONS

The present application is related to and incorporates by reference each of the following granted U.S. Pat. Nos. 5,598,427; 5,987,058; 5,953,368; 4,977,577; 5,067,136; 5,095,493; 5,408,217; 5,311,541; 5,119,396; 5,265,120; 6,111,911; 5,668,828; 5,920,589; 5,457,713; 6,031,883; 5,999,561; 6,639,939; and 6,335,963. The present application is also related to and incorporates by reference each of the following pending patent applications: U.S. Patent App. Ser. Nos. 60/632,662; 60/634,548; 09/720,270; and 10/662,530.

BACKGROUND OF THE INVENTION

1. Field of Invention

The present invention relates to the field of determining the physical location of a sensor. In particular, the present invention relates to a method, system, apparatus, and computer program product for determining a physical location of a sensor that relays information through a wireless radio network.

2. Discussion of the Background

Wireless communications have been adapted for many commercial uses. One use concerns the collection and relay of data from a distributed set of sensors to a central processing facility via one or more transmission and relay towers. In conventional systems, a sensor (e.g., a commercial utility power, gas, or water usage meter) is connected to a wireless transmitter. The transmitter relays information to a central account facility via a data collector or relay tower. The transmission time may be random or scheduled. If one or more transmitters are located out of range of the relay tower, repeaters are placed in one or more locations to receive and relay the transmission. Due to cost considerations, these repeaters often are not full duplex devices. That is, the repeaters often operate on a schedule where for a portion of time the repeater listens for a broadcast and then for another portion of time the repeater transmits whatever has been relayed. Additional periods exist where the repeater is neither receiving nor transmitting.

Background communication systems may be characterized by an inefficient flooding of information. That is, information sent by a sensor/transmitter may be received directly by a relay tower or data collector and still be repeated by one or more repeaters. What is desired, as recognized by the present inventors, is an efficient way to selectively relay information via a wireless transmission network.

Further, sensor devices in a background remote metering system, or other telemetry system, may be misplaced or stolen and installed in a location that is unknown to the system operator. While the system operator may quickly detect the absence of the sensor device, or a tamper alarm, the physical location of the sensor device is often extremely difficult to pinpoint. In addition, this problem is compounded by the fact that background systems make it possible to collect sensor information without having a person visit the sensors and verify their locations. What is further desired, as recognized by the present inventors, is an efficient way to determine the physical location of a sensor device.

SUMMARY OF INVENTION

Accordingly, one object of this invention is to provide a novel method that determines a physical location of an unknown position device (UPD) in a communication network including a plurality of known position devices (KDPs), in which a message transmitted by the UPD is received by plural KDPs. The method includes measuring a signal quality of each received message received by the plural KDPs from the UPD, and computing the likely physical location of the UPD based on the physical location of the plural KPDs receiving the message from the UPD and the respective signal quality measured at each KPD.

Another object of this invention is to provide a novel method for determining a physical location of an unknown position device (UPD) in a communication network. The method includes steps of receiving first messages from plural known position devices (KPD), each first message including a signal quality of a second message received at a corresponding KPD from the UPD, the signal quality as measured at the KPD. The method also includes computing the physical location of the UPD based on a physical location of each of the plural KPDs, and the signal quality of the second message as measured at the KPD.

Another object of this invention is to provide a novel regional network interface (RNI) device in a communication network that includes at least one known position device (KPD) and an unknown position device (UPD). The RNI includes a receiving unit configured to receive at least one first message from the at least one known position device (KPD), each received first message including a respective signal quality of a second message received at each KPD from the UPD, the respective signal quality as measured at each KPD. The RNI also includes a storing unit configured to store a list of possible locations of the UPD, and a generating unit configured to generate a list of likely locations of the UPD using a location algorithm based on the stored list of possible locations of the UPD, a physical location of the KPD, and the respective signal quality of the second message as measured at each KPD.

An additional object of this invention is to provide a novel known position device (KPD) in a communication network. The KPD located at a physical location and including a receiver unit configured to receive a first message from an unknown position device (UPD), a signal quality measurement unit configured to measure a received signal quality of the first message, and a transmitter unit configured to transmit a second message including the received signal quality to a regional network interface (RNI) that is configured to generate a list of likely locations of the UPD based on a list of possible locations of the UPD, the physical location, and the signal quality.

A further object of this invention is to provide a novel computer program product storing a program which when executed on a computer determines a physical location of an unknown position device (UPD) in a communication network. The program includes steps of receiving a first message from a known position device (KPD), the message including a signal quality of a second message received at the KPD from the UPD, the signal quality as measured at the KPD, and generating a list of likely locations of the UPD using a location algorithm based on a list of possible locations of the UPD, a physical location of the KPD, and the signal quality of the second message as measured at the KPD.

An additional object of this invention is to provide a novel communication system including an unknown position device (UPD) configured to transmit a first message. The system also includes a known position device (KPD) located at a physical location and including a KPD receiver unit configured to receive the first message from the unknown position device (UPD), a signal quality measurement unit configured to measure a received signal quality of the message, and a transmitter unit configured to transmit a second message including the received signal quality. In addition, the system includes a regional network interface (RNI) including an RNI receiving unit configured to receive the first message from the known position device (KPD), the first message including the signal quality of a second message received at the KPD from the UPD, a storing unit configured to store a list of possible locations of the UPD, and a generating unit configured to generate a list of likely locations of the UPD using a location algorithm based on the stored list of possible locations of the UPD, the physical location of the KPD, and the signal quality of the second message as measured at the KPD.

An additional object of this invention is to provide a novel method of determining a physical location of an unknown position device (UPD) in a communication network, the method comprising steps of polling a specific meter id of the UPD; receiving a first message at at least one collector from the UPD; receiving a second message at the at least one collector from at least one known position device (KPD) configured to repeat the first message; deriving an information from at least one of the first message and the second message, the information including at least one of a UPD signal to noise ratio (SNR), UPD signal quality, UPD receiver quieting, and UPD bit error rate (BER) as measured by the at least one KPD; forwarding the derived information to a centralized processor from the at least one collector; and resolving a location of the UPD by the at least one collector or the centralized processor based on a location of the at least one KPD and the derived information in at least one of a triangulation algorithm, a multilateration algorithm, and a center of mass algorithm.

An additional object of this invention is to provide a novel method of determining a physical location of an unknown position device (UPD), the method comprising steps of: generating a blanket poll to the UPD and to at least one known position device (KPD) in a reception area, receiving a first message at at least one collector from the UPD; receiving a second message at the at least one collector from at least one KPD configured to repeat the first message; deriving an information from at least one of the first message and the second message, the information including at least one of a UPD signal to noise ratio (SNR), UPD signal quality, UPD receiver quieting, and UPD bit error rate (BER) as measured by the at least one KPD; forwarding the derived information to a centralized processor from the at least one collector; and resolving a location of the UPD by the at least one collector or the centralized processor based on a location of the at least one KPD and the derived information in at least one of a triangulation algorithm, a multilateration algorithm, and a center of mass algorithm.

An additional object of this invention is to provide a novel method of determining a physical position of an unknown position device (UPD), the method comprising steps of: receiving messages automatically generated by the UPD on a periodic basis and identifying in a table a meter or list of meters having an unknown location or being suspected of having an unknown location; receiving a first message at at least one collector from the UPD; receiving a second message at the at least one collector from at least one known position device (KPD) configured to repeat the first message; deriving an information from at least one of the first message and the second message, the information including at least one of a UPD signal to noise ratio (SNR), UPD signal quality, UPD receiver quieting, and UPD bit error rate (BER) as measured by the at least one KPD; forwarding the derived information to a centralized processor from the at least one collector; and resolving a location of the UPD by the at least one collector or the centralized processor based on a location of the at least one KPD and the derived information in at least one of a triangulation algorithm, a multilateration algorithm, and a center of mass algorithm.

DETAILED DESCRIPTION OF THE INVENTION

Figure 1:
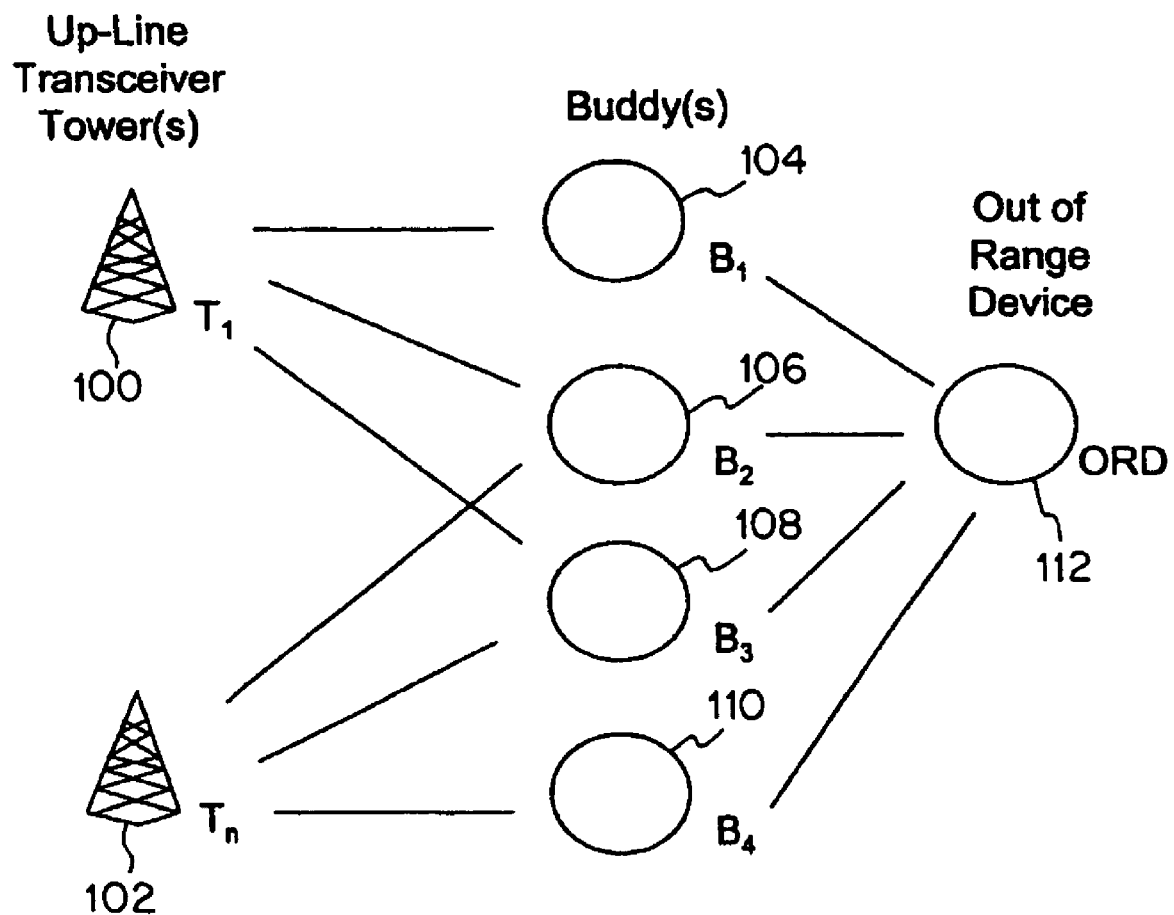
FIG. 1 is an architectural overview of an embodiment of the present invention.

One embodiment of the present invention includes a system for receiving and relaying messages from a deployed set of independent sensor devices to a regional network interface (RNI) via one or more other sensor devices, and one or more tower repeaters or optionally data collectors. Each sensor device is in a known location or an unknown location. A sensor device in a known location is referred to herein as a Known Position Device (KPD). A sensor device in an unknown location is referred to herein as an Unknown Position Device (UPD). The RNI is configured to determine a physical location of a UPD.

Each sensor device may include a sensor for collecting data and a transmitter. The transmitter may have two modes of operation, a 'normal' mode and a 'special' mode. The sensor device may also include a receiver and a receiver queue for receiving messages. Other components in the sensor device may include those for receiving, storing, encoding and transmitting messages that include measurement data collected by the sensor. Messages transmitted by the sensor device may also include a unique device identification number.

Each tower repeater or data collector is configured to receive messages from one or more sensor devices, or optionally one or more data collectors, and forward the messages to the RNI.

When in 'normal' mode, the sensor device may periodically or randomly transmits a message including sensor data, and the message may be received by one or more tower repeaters and optionally one or more data collectors. A data collector is a communication device configured to receive messages and relay the received messages to the RNI via another sensor device, another data collector or a tower repeater. However, unlike a tower repeater, a data collector does not have to be mounted to a tower. For example, a data collector may be deployed on a rooftop, a power pole, a light standard, a side of a building, or in any other convenient location. Alternatively, a data collector may be temporarily deployed or deployed on a mobile platform. Each data collector may store and relay data either directly to the RNI or to the RNI via a tower repeater, another data collector, or another communication medium.

When in 'special' mode, the sensor device may periodically or randomly sensor data to a tower repeater via another device (a.k.a. a 'buddy' device). The buddy device may be a peer sensor device, a data collector, or another device configured to receive and relay a transmission. In one embodiment, the sensor device mode of operation is set by an operator upon installation. In another embodiment, the mode of operation is set or changed via a wireless command. In a further embodiment, the mode of operation is changed by the sensor device upon occurrence of a predetermined set of conditions.

A sensor device operating in the special mode may be out of range of a tower repeater or data collector. Out of range devices may be configured to only transmit or to transmit and receive wireless communications.

The normal and special modes may differ in various ways, including at least frequency, modulation, power, noise immunity, information density, and message format. Other features may also distinguish the normal and special modes of operation.

Each sensor device configured to be a buddy device (i.e., configured to relay data from another device) may include a receiver configured to receive a special mode transmission. The buddy device may also include a queue configured to hold one or more messages received from one or more devices operating in the special mode.

Each buddy device may also be configured to measure the signal quality of an incoming special mode message. The buddy device may be further configured to vary the transmit timing of the relayed message based on the signal quality of the incoming special mode message. For example, the timing of when the incoming message is relayed may be determined by whether the signal quality of the incoming signal is above or below one or more thresholds. If the signal quality is above the highest threshold, the buddy device will relay the incoming signal more quickly than if the signal quality is below the highest threshold. That is, the response time of the relay delay may be inversely proportional to the received signal quality. One or more thresholds may be used. To avoid collisions between two or more buddy transmissions, each buddy device also may optionally apply an additional random timing delay (a.k.a. jitter) to the threshold determined delay.

Sensor devices configured as two way communication devices may be capable of autonomously acting as buddy devices while carrying out normal sensing functions. Further, in two way endpoints, normal sensing functions may supersede buddy functions during operation.

The system may also include one or more tower repeaters configured to receive the normal and relayed transmissions. At a predetermined time after a relayed transmission is received at a tower from a buddy device, a tower repeater may broadcast an acknowledgement which includes the device identification of the sensor device operating in the special mode. All devices which receive the acknowledgement examine their queue of received messages. If a message in queue corresponds to the device ID included in the acknowledgement message, the message may be deleted from the queue. Thus, unnecessary broadcasts and unwanted collisions are avoided.

It can be seen that if the Acknowledge message is suppressed then all of the Buddies will eventually repeat the UPD message and its corresponding signal strength/signal quality. This information can then be used per the subsequent teachings to produce a position fix. In addition, a poll message can be used to initiate the message from the UPD.

The tower repeater may be configured to send the acknowledgement (including the device ID) within a predetermined acknowledgement time. The predetermined acknowledgement time and the predetermined delays of the buddy device that correspond to the threshold values may be established so that buddy devices closest to the out of range device (i.e., with the highest received signal quality) are provided a first opportunity to relay. If an acknowledgement is not received within a certain predetermined time, the relay message may be sent by buddy devices which detected a signal quality lower than the first threshold. In one embodiment, only one signal quality threshold is used (thus dividing the buddy devices into two groups—an early relay group and a delayed relay group). In another embodiment, multiple thresholds and delays may be employed Turning now to the figures, in a discrete message packet based radio network, one possible objective of the system is to improve the range and/or to reach difficult coverage areas by repeating messages through 2-way end-points. Another possible objective is to eliminate routing by point identity. Therefore, in one embodiment of the invention, any qualifying 2-way end-point which is in range and that receives the message to be repeated will queue the message for re-transmission. In order to reduce simultaneous re-transmissions from in-range 2-way devices, the re-transmission time can be randomized or skewed by other means.

As shown in the example of FIG. 1, a sensor device that is out of direct communication range with a tower is identified as an Out of Range Devices (ORD). In this example, the ORD 112 sends a message that is received by other Buddy devices ($B_1$-$B_n$, 104/106/108/110) configured as 2-way endpoints. The 2-way endpoints, once their queued re-transmission time is reached, re-transmit the ORD's message to 'up-line' transceivers $T_1$ 100 and $T_n$ 102.

To reduce the chance of collision and on-air repeated message traffic, an 'up-line' transceiver, such as tower $T_1$ 100 in FIG. 1, may acknowledge that it received the message by transmitting an acknowledgement message that contains the ID of the initiating device. This acknowledgement message in turn extinguishes all pending repeat messages that match the ID of the initiating device.

Figure 2A:
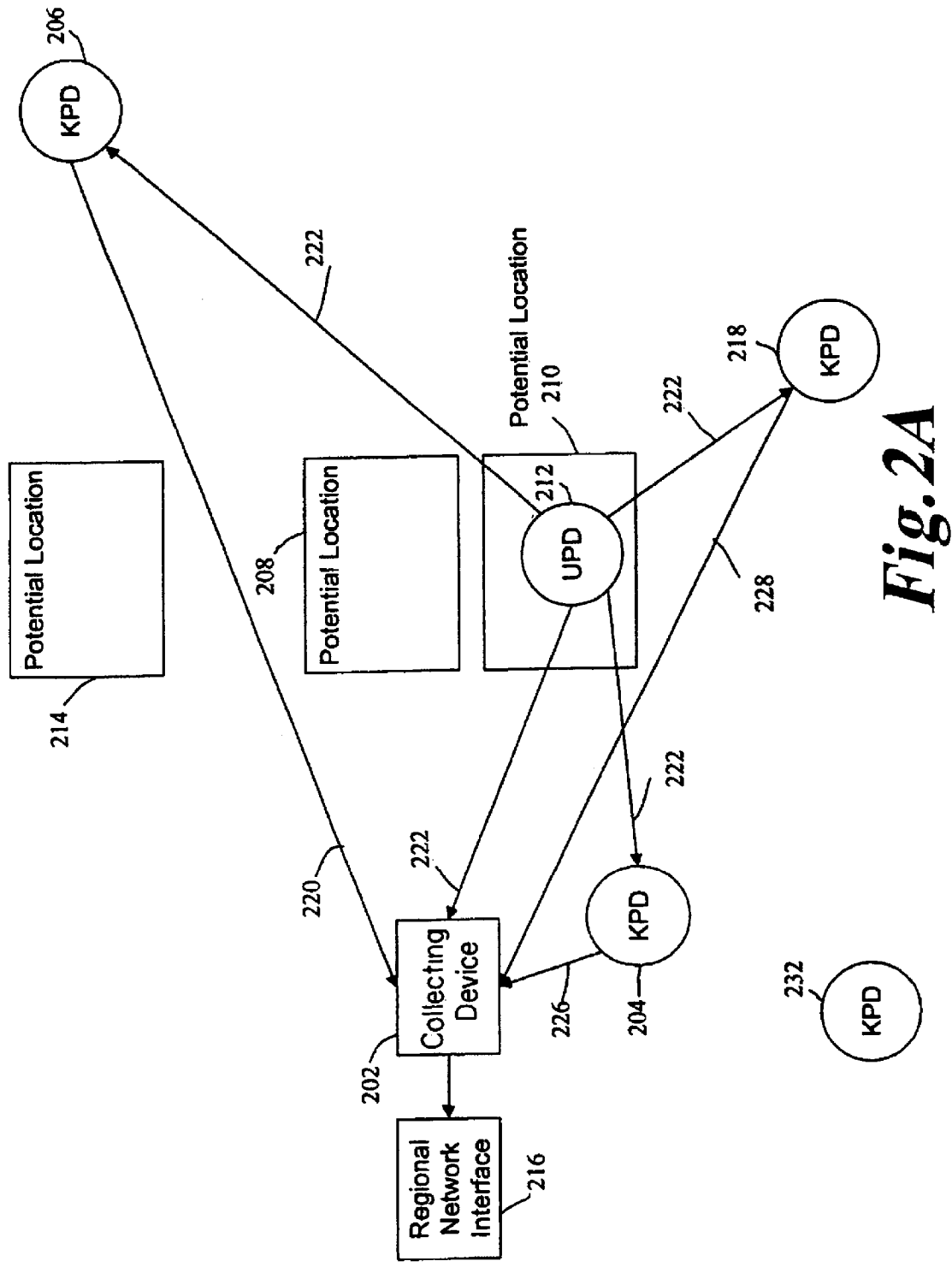
FIG. 2A is an overview of a further embodiment of the present invention.

FIG. 2A shows a further embodiment of the present invention including a communication network that includes collecting device 202, wireless communication devices (e.g., sensor devices) at known positions (a.k.a., Known Position Device) KPD 204/206/218/232, a wireless communication device at an unknown position (a.k.a., Unknown Position Device) UPD 212, and potential locations for wireless communication devices 208/210/214. The collecting device 202, such as a tower repeater or a collector, is configured to receive a message from the KPDs and UPDs and the KPDs are configured to receive a message and forward that message and other information to a tower repeater. A collector may be a mesh type repeater configured to forward data to RNI 216, thereby eliminating the need for a tower repeater.

In the example of FIG. 2A, a physical location of the UPD is not known by the system operator because the UPD (e.g., water/gas/electric consumption meter/sensor) was removed by an unauthorized party (e.g., malicious tampering by a utility customer), by a non-reporting authorized party (e.g., meter installation by an authorized installer who failed to properly record or report the physical location of the sensor), or otherwise moved. Alternatively, the locations of KPD 204/206/218/232 are known by the system operator. For the purposes of this discussion, a location is information allowing the system operator to visit and/or find the device, and may include at least one of a latitude/longitude, latitude/longitude/elevation, relative distance and heading from another known location, a street address, a description of a location, or other means for identifying a physical location.

In this example, KPDs 204/206/218 each receive a message 222 from the UPD 212. Optionally, there may be additional KPDs in the system that do and do not receive the message 222 from the UPD. For example, KPD 232 does not receive the message 222 from the UPD. Further, each of the devices receiving the message 222 (i.e., KPD 204/206/218 and collecting device 202) determines a message quality information for that message. The message quality information may include one of a received signal strength, a bit error rate, a received signal delay, a receiver quieting, a signal to noise ratio (SNR) or another parameter of signal quality (signal quality). Further, each of the devices receiving the message 222 may send a repeated message or a combination of received messages to the collecting device 202. The repeated message or combination of messages may include a portion of the contents of message 222 and the message quality information. For example, KPD 204 sends repeated message 226, KPD 218 sends repeated message 228 and KPD 206 sends repeated message 220. The collecting device 202 forwards received messages 220/222/226/228 to the RNI 216 for physical location determination.

In addition, the RNI 216 may include a list of potential locations (list not shown) where a sensor may found. For example, a potential location for an electrical power sensor may be limited to locations in series with an electrical power feed, a potential location for a water meter may be limited to locations along a water main or sewer, and a potential location for a gas meter may be limited to locations along a gas main or branch line. Further, the potential locations may include a physical location of a sensor that previously was suspected of exhibiting an error condition or was suspected of being tampered with, a location that does not receive service from the system operator (e.g., an address of a non-customer), a location fitting a profile of a location that is used to keep missing sensors (e.g., a basement, a storage closet, a warehouse, an abandoned building, a garage, a building or apartment, a location near the last known physical location of the sensor, a physical location having other sensors, etc. . . . ), or another potential location. In this example, the list of potential locations at the RNI 216 includes potential locations 208, 210 and 214.

The RNI 216 is further configured to produce a most likely location of the UPD or a list of likely locations from the list of potential locations. The likely locations are potential locations where a UPD is likely to be found such as the latitude and longitude of an existing meter or meter socket. The RNI produces the list of likely locations based on the quality information received from KPDs and/or optionally other data collectors that receive a message from the UPD. The RNI may further include a location determination algorithm, for example a triangulation algorithm, a center of mass algorithm or a multilateration algorithm to produce the list of likely locations, based on the quality information received from KPDs and/or optionally other data collectors that receive a message from the UPD.

Although the embodiments discussed so far include plural KPDs or optionally data collectors providing repeated messages with message quality information to a RNI, the present invention also includes a system in which only a single KPD receives a message from a UPD and a physical location of the UPD is determined based on a proximity of possible locations to the location of the KPD.

In this example, the list of likely locations produced by RNI 216 includes potential locations 208 and 210 which are determined to be close to the determined physical location of the UPD, but does not include potential location 214, which is determined to be not close to the determined physical location of the UPD. Further, the RNI 216 may use one or more threshold determinations based upon predetermined threshold factors to identify which potential locations should be added to the list of likely locations.

Although in this embodiment the RNI determines a physical location of a UPD based on message quality information from a single message 222 received at various other locations, the invention also includes alternative embodiments in which the RNI determines the physical location of a UPD based on message quality information that is received in plural messages transmitted by a UPD over a predetermined period of time, or based on message quality information forwarded to the RNI over a predetermined period of time.

The message 222 from the UPD may be a message sent automatically by the UPD, or message 222 may be sent in response to a trigger message received by the UPD (not shown). A message sent automatically by the UPD may be a message sent when a predetermined condition is satisfied, at a predetermined rate, at a predetermined time, at a random time or rate, or by some other factor. Further, the trigger message received by the UPD may include a status request message for the status of a UPD having a particular unique ID, a broadcast message requesting all devices of a particular class to transmit a message, or another type of message. The message 222 may also include, for example, a message indicating the UPD has been tampered with, an initialization message indicating the UPD has been installed, or a normal operating mode message.

In addition, the message 222 may be one of a special mode (e.g., a message pass mode) message or a normal mode message, as described below. Further, the UPD and KPDs may be ORDs and buddy devices and the controller may be a an Up-line Transceiver Tower (LUTT), as described below.

Figure 2B:
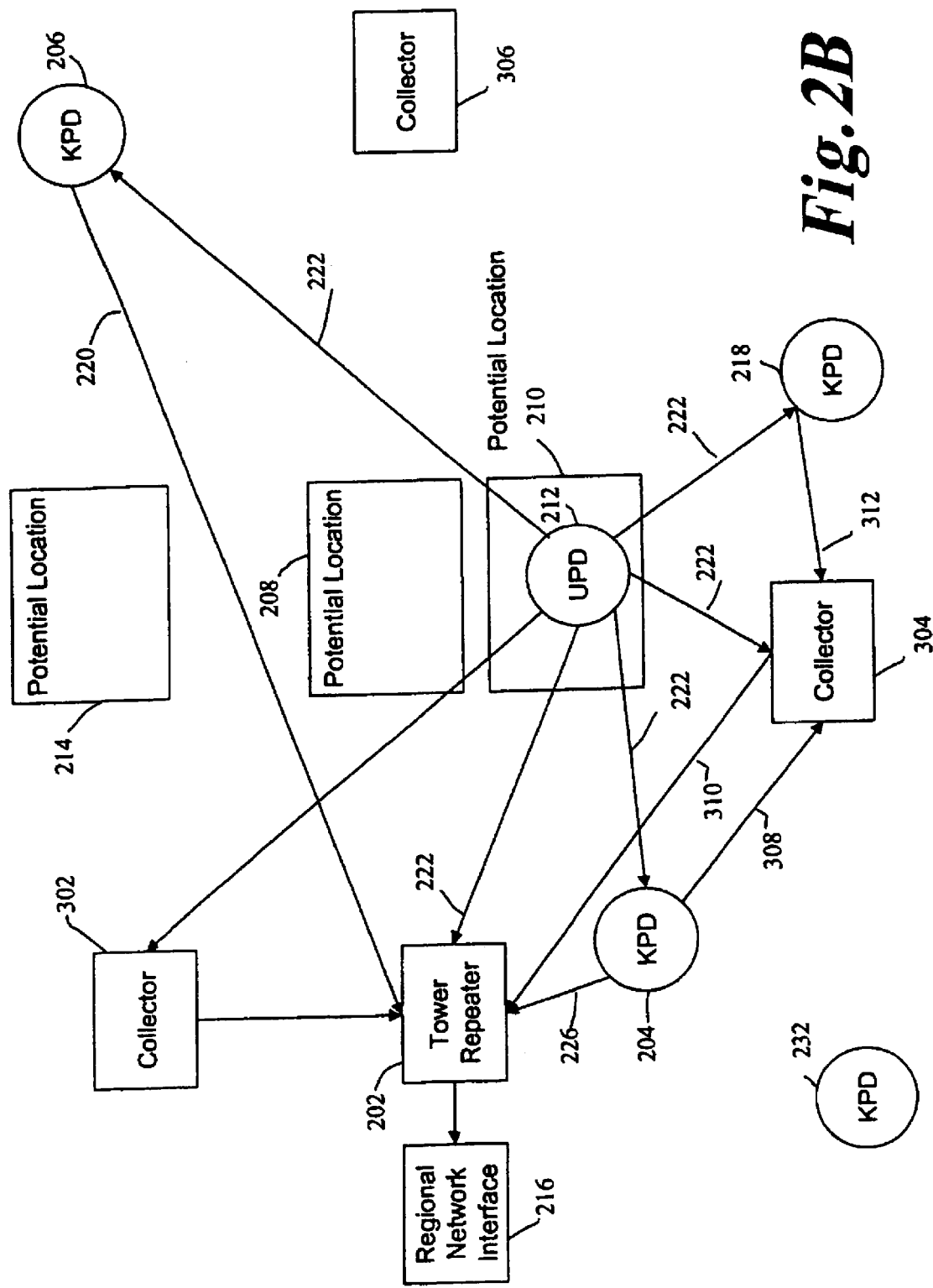
FIG. 2B is an overview of a further embodiment of the present invention.

FIG. 2B shows an alternative embodiment of the present invention that is similar to the embodiment of FIG. 2A, but also includes data collectors 302/304/306 to provide additional message relay capability. In this example, data collectors 302/304 each receive message 222 from UPD 212, and data collector 306 does not receive message 222 from UPD 212. Each data collector sends a repeated message or combination of messages to the RNI via another data collector, a sensor device, or a tower repeater. As in the embodiment above, the repeated message or combination of messages may include a portion of the contents of message 222 and the message quality information.

Further, a data collector may also receive a repeated message from a KPD or another data collector. In this example, data collector 304 receives repeated message 312 from KPD 218 and data collector 304 sends a repeated message 310, including the information in the repeated message 312, to tower repeater 222.

Further, a data collector may be deployed at a fixed known location or alternatively deployed on a mobile platform with a physical location that is known at the time of receiving a message.

Figure 2C:
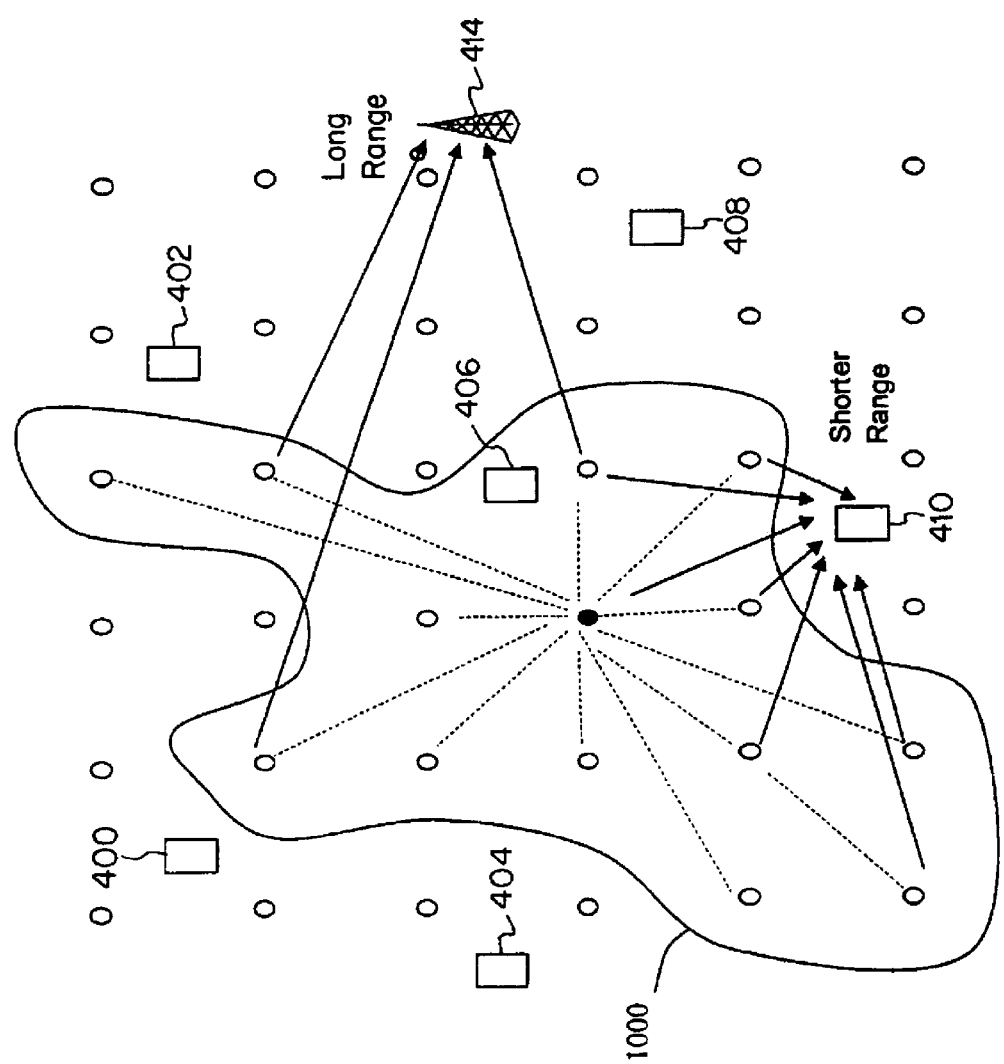
FIG. 2C is an overview of a further embodiment of the present invention.

FIG. 2C shows a further possible embodiment of the present invention including plural data collectors (rectangles) 400/402/404/406/408/410, plural KPDs (open circles) and a UPD 412 (filled circle). Short range messages may be sent from some KPDs and the UPD to a data collector 410, and some long range messages may be sent from some KPDs to a tower 414. In this example, an RNI (not shown) determines a physical location of the UPD 412 using a center of mass computation based on message quality information for messages from the UPD 412 received by some KPDs. The KPDs included in the center of mass computation are the KPDs receiving messages (dotted lines) from the UPD 412 and are located within marker 1000. For example, the center of mass algorithm allocates a mass to each KPD included within marker 1000 and the allocated mass is based on a message quality information for a message from the UPD received by that KPD. Further, the center of mass algorithm calculates a centroid or center of mass for the area within marker 1000 based on the allocated mass of each KPD within marker 1000. Alternative known methods of performing a center of mass calculation may also be performed, or another calculation, such as a multi-lateration computation may be performed based on a signal-to-noise ratio (SNR) of messages from the UPD to KPDs in the area 1000.

Figure 3:
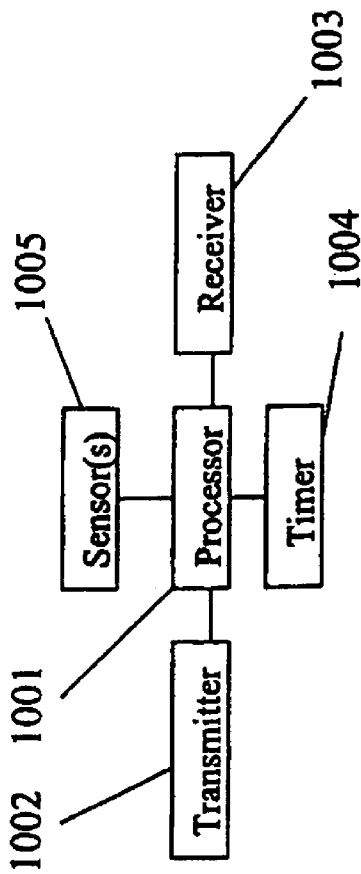
FIG. 3 is a simplified block diagram of one embodiment of a KPD or a UPD according to the present invention.

FIG. 3 shows a block diagram of communication devices such as KPDs, UPDs, ORDs and Buddy devices. These communication devices may include a processor 1001 and a transmitter 1002. Further, these communication devices may contain a receiver 1003, timer 1004, and or sensors 1005. Buddy devices may include a processor 1001, transmitter 1002 and receiver 1003. In addition, Buddy devices may contain a timer 10043 and/or sensors 1005. A processor may be a microprocessor or microcontroller that may contain Random Access Memory (RAM), Read Only Memory (ROM), Electrically Erasable Read Only Memory (EEROM), and a Central Processing Unit (CPU) that processes instructions programmed according to the teachings of the invention and operates on data structures, tables, records, or other forms of data. The processor 1001 is connected to and communicates with other blocks in the communication device. The transmitter 1002 may be capable of modulating messages sent by the processor and sending out wireless messages to other devices. The receiver 1003 may be capable of demodulating wireless radio messages sent by other devices and passing them to the processor for further processing. The timer 1004 may be used by the processor to schedule times for wireless transactions and other housekeeping functions such as reading data from equipment attached to sensors 1005. The sensor(s) 1005 is (are) interface(s) that allow the processor 1001 to sample the environment around the communication devices.

Figure 4:
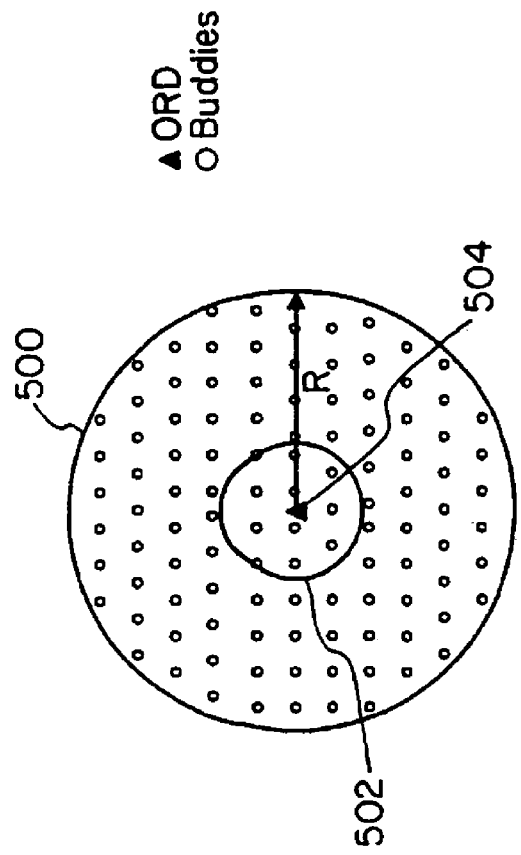
FIG. 4 is a geographic representation of a mode of operation of one embodiment of the present invention.

A reduction in the number of collisions and/or message traffic from re-repeats may be obtained based on the spherical propagation of radio signals, or a circular propagation if the receivers are on or near the ground, as shown in FIG. 4. There may be exponentially more receivers at the perimeter of a circle 500 than at its center, because the area (A) covered by the propagation circle 500 increases as the square of the distance (R) from the device to be repeated by $A = \Pi R^2$. So, it may be desirable to give the small number of repeaters closer to the device to be repeated an advantage over the ones at the perimeter, in order to reduce collisions and message traffic from re-repeats.

Therefore, an in-range 2-way end-point (IREP) such as the buddy devices (open circles) within the range (i.e., within radio propagation circle 500) of an ORD 504, also measures received signal strength, signal to noise ratio (SNR) or a like parameter of signal quality. The IREP may inversely weight signal quality to maximum transmit delay. The closest (& fewest) IREPs (e.g., TREPs within circle 502) automatically repeat the message more quickly and an up-line (tower or the like, not shown) receiver acknowledges and extinguishes the vast majority of IREPs that have not reached their longer time out. In other words, the delay time before a message is repeated may be inversely related to the received message signal quality (e.g., the greater the signal quality the shorter the delay time).

In addition it is also possible to reduce the number of repeated messages from repeaters with low SNR to next tier of the communications system, often a tower. When a two-way device communicates with the next tier, often a tower, the two-way device may store an indication of link margin such as signal strength, SNR, % throughput, quieting or the like.

An inverse weighing function may also be used, such that a better link margin is able to respond to a repeat request faster than a low link margin two-way device.

As a further refinement, the next tier of communications may have multiple nodes that can receive a repeated message. In one embodiment the next tier is a tower based transceiver and this transceiver acknowledges the repeated message to minimize multiple repeats. As an improvement the next tier sends this acknowledgement message after a short delay that is time skewed or randomized up to N seconds, or up to 3 seconds in a preferred Buddy Mode. Therefore, if several towers receive a repeated message, their respective acknowledge messages will be less likely to collide.

The acknowledgement message may contain an indication of link quality as a part of its data payload.

This inverse SNR/signal quality repeat delay method is also applicable to mobile radio systems such that when mobile interrogator sends a broadcast poll to local devices, the closest devices respond the quickest, thereby reducing the probability of RF collisions from more distant devices.

It should be understood by one skilled in the art that variations of the above invention can be used in other network topologies both with and without the use of tower based transceivers and that the invention can be used in systems utilizing 'N' tiers as-is and/or removing the inverse function from the time waiting therefore maximizing message repeat distance.

A possible advantage of this system over mesh type architectures is that the end-points, Buddies & Out of Range Devices (ORDs), may be "memory-less". All states & paths may be automatically achieved with minimal RF communications overhead, which may eliminate system lock-ups or lost messages due to lost or no longer applicable path conditions.

An example implementation of the instant invention may include a system for wirelessly reading utility meters in a city. Utility meters in the city are connected to devices which can read utility consumption from the meter and then transmit that consumption data wirelessly, such as using a Wireless Meter Reading Device (WMRD). In the system, messages flow from WMRDs to Up-line Transceiver Towers (ULTTs) which may be as far as 7 to 10 miles away from the WMRDs. ULTTs are usually co-located with pre-constructed Cellular Communications Towers or other elevated infrastructure. Wireless messages may use a narrowband multi-level Frequency Shift Keyed (FSK) or filtered Minimum Shift Keyed (GMSK) modulation format, for example. The messages can be interleaved, convoloutionally encoded, and or encrypted with post-reception data integrity testable with a Cyclical Redundancy Check (CRC) value. Most WMRDs may be 2-way devices capable of operating as Buddy devices which allows the ability to extend range by adding a repeater capability, but without adding additional repeater hardware. The repeater function may be intrinsic to the network without requiring specialized repeater hardware. WMRDs may operate by sending messages directly to ULTTs, but when WMRDs are out of range, shaded, or otherwise unable to directly communicate with ULTTs, they can be configured to transmit in a special Message Pass (MPass) mode. MPass mode uses GMSK modulation instead of FSK and can be received by other 2 way WMRDs acting as Buddies. MPass messages may also use a different radio frequency than normal mode FSK messages to reduce loading in a specific channel. An MPass message may be received by all Buddy WWRDs in range and may be queued to be repeated by the WMRDs that receive it. Messages may be queued between 0 and 120 seconds with the actual time delay being inversely proportional to the SNR of the MPass message as detected by each individual Buddy WMRD plus a pseudo-random dither time. Buddy WMRD devices may repeat a message using a normal WMRD to ULTT multi-level FSK modulation mode. After the first Buddy WMRD to timeout repeats its queued message to the ULTT(s), the ULTT(s) may pseudo-randomly delay between 0 and 3 seconds to avoid colliding with other ULTTs and then transmit an MPass acknowledgement message that is receivable by Buddy WMRDs. The MPass acknowledge message may contains the ID of the ORD which sent the original MPass message. When a Buddy WMRD receives an acknowledgement message that has an ID matching one of it's queued messages, it may delete the message from the queue thereby preventing already repeated messages from being repeated again.

To send messages back to the ORD, the ULTT or a back end processor connected to all UUTTs may keep a data base for each WMRD containing the best performing Buddy WMRDs that have repeated messages from the ORD as well as the best performing ULTTs from the perspective of the ORD. When a message needs to be sent to the ORD, the data base may be accessed and the best path is looked up based on the data base which may be automatically dynamically updated my monitoring repeated messages from Buddy(s) repeating the ORD. A message may be sent with the appropriate routing information through the best ULTT and best Buddy. If this fails, the system may re-send the message, and upon some threshold of failed attempts, pick the next best alternative return path until there is success. Alternatively, when there is no historical data the Latitude and Longitude of each WMRD may be stored in the WMRD at installation time. Upon failure of a tower down link to communicate with an endpoint (e.g., an ORD), the central processor or ULTT can use the stored Latitude and Longitude information to choose a Buddy in proximity to the ORD. Since proximity may not directly correlate to best signal path, several tries with other nearby buddies may be required. A possible advantage to this return path method calculation is that the data base is not required to be distributed, and may be located in one controlled area. As path algorithms are improved in the future they can be readily upgraded and controlled, and system cost is held low since more sophisticated hardware is not required at each WMRD.

Figure 5:
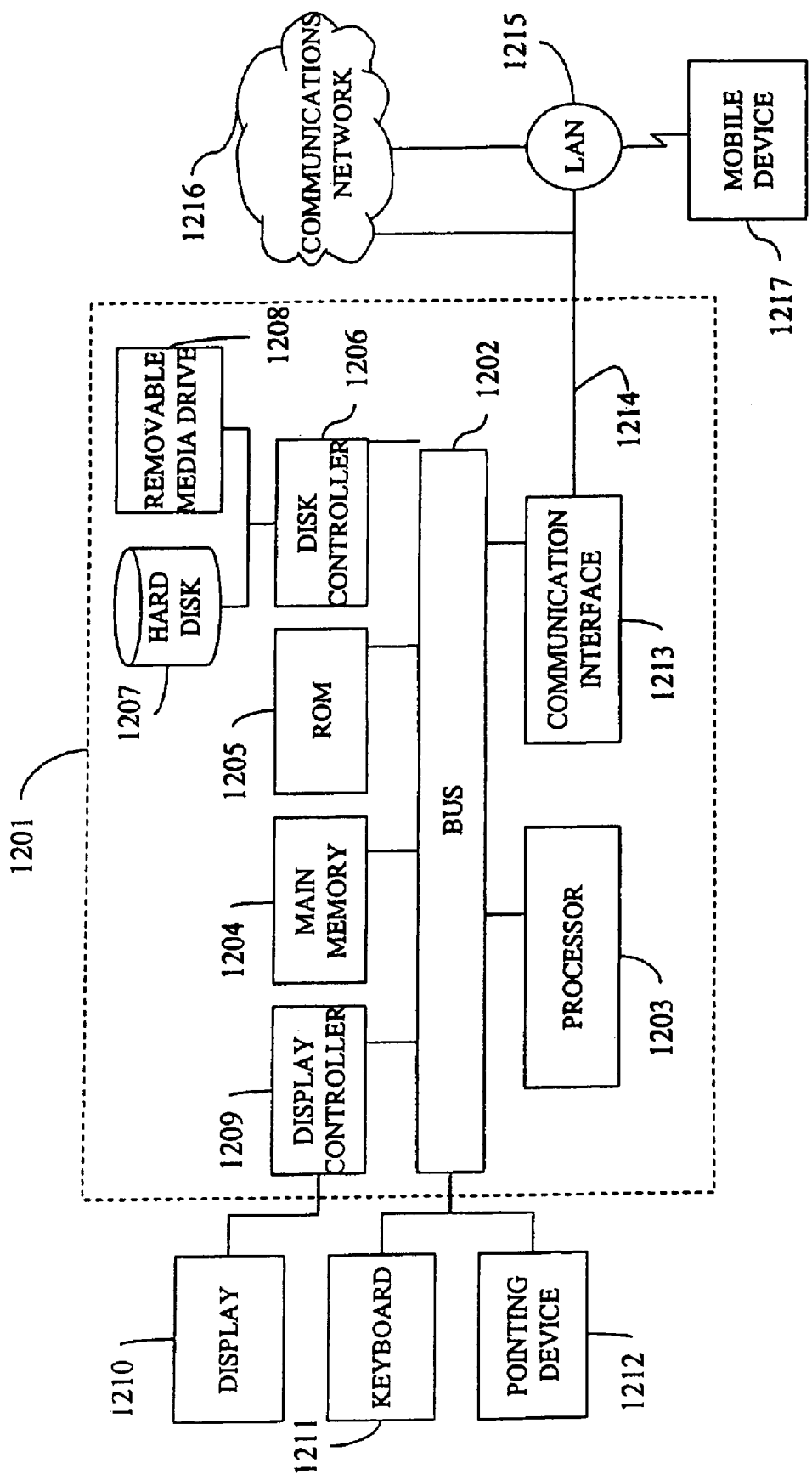
FIG. 5 is a block diagram of a computer associated with an embodiment of the present invention.

FIG. 5 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Numerous modifications and variations of the present invention are possible in light of the above teachings. It is therefore to be understood that the invention may be practiced otherwise than as specifically described herein.

The invention claimed is:

1. A method for determining a physical location of an unknown position device (UPD) in a communication network, the communication network including plural known position devices (KPDs), said method comprising:
   storing known potential locations of the UPD, the known potential locations related to known positions of utility service lines;
   receiving a message transmitted by the UPD at least one of the plural KPDs;
   measuring a signal quality of the message received from the UPD by the at least one of the plural KPDs; and
   transmitting a data message from the at least one of the plural KPDs to a regional network interface, the data message including the signal quality;
   computing, at the regional network interface, an approximate physical location of the UPD based on a physical location of the at least one of the plural KPDs and the signal quality measured at the at least one of the plural KPDs; and
   producing a list of likely locations of the UPD based on the approximate physical location of the UPD and the known potential locations of the UPD,
   wherein the known potential locations include a physical location of a sensor that was suspected of exhibiting an error condition or was suspected of being tampered with.

2. The method of claim 1, wherein the measuring the signal quality comprises measuring at least one of a signal to noise ratio (SNR), a receiver quieting, or a bit error rate (BER) of the message.

3. The method of claim 1, wherein the UPD is a utility meter.

4. The method of claim 1, further comprising:
   receiving a tamper message including a unique identifier of a tampered device in the communication network, wherein
   the computing comprises computing the approximate physical location of the UPD based on the unique identifier of the tampered device.

5. The method of claim 1, wherein the known potential locations of the UPD include locations of existing utility meters or existing utility meter sockets.

6. The method of claim 1, wherein the known potential locations include at least one of street addresses of customers which receive service and street addresses of customers which do not receive service.

7. The method of claim 1, wherein the transmitting the data message from the at least one of the plural KPDs comprises transmitting the data message at a time period after the message is received from the UPD, the time period based on whether the signal quality of the message received from the UPD is above or below one or more signal quality thresholds.

8. The method of claim 7, further comprising:
transmitting an acknowledgement to the plural KPDs after the data message from the at least one of the plural KPDs is transmitted, the acknowledgement including a unique identifier of the UPD; and
updating a transmission queue of each of the plural KPDs based on the unique identifier included in the acknowledgement.

9. A method, implemented by a regional network interface, for determining a physical location of an unknown position device (UPD) in a communication network, said method comprising:
storing known potential locations of the UPD, the known potential locations related to known positions of utility service lines;
receiving, at the regional network interface, a first message from each of plural known position devices (KPDs) in the communication network, each of the first messages including a signal quality of a second message, each second message received by a respective KPD from the UPD;
computing an approximate physical location of the UPD based on a physical location of each of the plural KPDs and the signal quality of the second message received from each of the plural KPDs; and
producing a list of likely locations of the UPD based on the approximate physical location of the UPD and the known potential locations of the UPD,
wherein the known potential locations include a physical location of a sensor that was suspected of exhibiting an error condition or was suspected of being tampered with.

10. The method of claim 9, wherein
the receiving the first messages comprises receiving signal quality information based on at least one of a UPD signal to noise ratio (SNR), a UPD receiver quieting, or a UPD bit error rate (BER) of the second message as measured at each of the plural KPDs, and
the computing further comprises computing the approximate physical location of the UPD based on at least one of the UPD SNR, the UPD receiver quieting, or the UPD BER.

11. The method of claim 9, wherein the computing comprises performing at least one of a triangulation algorithm, a multilateration algorithm, or a center of mass algorithm based on the signal quality of the second message as measured at each of the plural KPDs to compute the approximate physical location of the UPD.

12. The method of claim 9, wherein the UPD includes a utility meter.

13. The method of claim 9, wherein the computing comprises computing the approximate physical location of the UPD based on locations of the plural KPDs in the communication network.

14. The method of claim 9, further comprising:
receiving a tamper message including a unique identifier of a tampered device in the communication network, wherein
the computing comprises computing the approximate physical location of the UPD based on the unique identifier of the tampered device.

15. A regional network interface (RNI) device in a communication network that includes plural known position devices (KPDs) and an unknown position device (UPD), the RNI comprising:
a receiving unit configured to receive a first message from each of the plural KPDs in the communication network, each of the first messages including a signal quality of a second message, each second message received by a respective KPD from the UPD; and
a computing unit configured to compute an approximate physical location of the UPD, the approximate physical location being computed based on a physical location of each of the plural KPDs and the signal quality of the second message received from each of the plural KPDs, and
produce a list of likely locations of the UPD based on the approximate physical location of the UPD and known potential locations of the UPD, the known potential locations related to known positions of utility service lines,
wherein the known potential locations include a physical location of a sensor that was suspected of exhibiting an error condition or was suspected of being tampered with.

16. The RNI of claim 15, wherein,
the receiving unit is configured to receive the first messages including signal quality information based on at least one of a UPD signal to noise ratio (SNR), a UPD receiver quieting, or a UPD bit error rate (BER) of the second message as measured at each of the plural KPDs, and
the computing unit is further configured to compute the approximate physical location of the UPD based on at least one of the UPD SNR, the UPD receiver quieting, or the UPD BER.

17. The RNI of claim 15, wherein the computing unit is configured to perform at least one of a triangulation algorithm, a multilateration algorithm, or a center of mass algorithm based on the signal quality to compute the approximate physical location of the UPD.

18. The RNI of claim 15, further comprising:
a tamper message receiving unit configured to receive a tamper message including a unique identifier of a tampered device in the communication network, wherein
the computing unit is further configured to compute the approximate physical location of the UPD based on the unique identifier of the tampered device.

19. A non-transitory computer-readable medium storing program instructions which, when executed by a computer to determine a physical location of an unknown position device (UPD) in a communication network, result in the computer performing the functions of:
receiving a first message from each of plural known position devices (KPDs) in the communication network, each of the first messages including a signal quality of a second message, each second message received by one of the plural KPDs from the UPD;
computing an approximate physical location of the UPD based on a physical location of each of the plural KPDs and the signal quality of the second message received from each of the plural KPDs; and
producing a list of likely locations of the UPD based on the approximate physical location of the UPD and known potential locations of the UPD, the known potential locations related to known positions of utility service lines, wherein the known potential locations include a physical location of a sensor that was suspected of exhibiting an error condition or was suspected of being tampered with.

20. A communication system, comprising: an unknown position device (UPD) configured to transmit a first message;

plural known position devices (KPD) located at physical locations, each KPD including a KPD receiver unit configured to receive the first message from the unknown position device (UPD), a measurement unit configured to measure a received signal quality of the first message, and a transmitter unit configured to transmit a second message including the received signal quality measured by the measurement unit; and a regional network interface (RNI) including an RNI receiving unit configured to receive the second message from each of the plural KPDs, each second message including the received signal quality measured at the KPD from which the second message was transmitted, and a computing unit configured to compute an approximate physical location of the UPD, the approximate physical location being computed based on a physical location of each of the plural KPDs and the received signal quality of the first message measured at each of the plural KPDs, and to compute a list of likely locations of the UPD based on the approximate physical location of the UPD and known potential locations of the UPD, the known potential locations related to known positions of utility service lines, wherein the known potential locations include a physical location of a sensor that was suspected of exhibiting an error condition or was suspected of being tampered with.

* * * * *